(12) United States Patent
Kang et al.

(10) Patent No.: US 7,052,525 B2
(45) Date of Patent: May 30, 2006

(54) VEHICLE INTEGRATED PROTECTIVE SYSTEM

(75) Inventors: Ki Ho Kang, Fairfax, VA (US); Boyd Lease, Melbourne, FL (US)

(73) Assignee: Ensco, Inc., Springfield, VA (US)

( * ) Notice: Subject to any disclaimer, the term of this patent is extended or adjusted under 35 U.S.C. 154(b) by 0 days.

(21) Appl. No.: 10/639,500

(22) Filed: Aug. 13, 2003

(65) Prior Publication Data

US 2006/0054025 A1    Mar. 16, 2006

Related U.S. Application Data

(60) Provisional application No. 60/402,702, filed on Aug. 13, 2002.

(51) Int. Cl.
*B01D 53/04* (2006.01)
*F25D 9/00* (2006.01)
*H01J 49/40* (2006.01)

(52) U.S. Cl. .......................... 55/385.2; 95/95; 95/148; 95/273; 96/397; 96/405; 96/417; 250/287; 250/288; 250/366; 250/361 R; 73/23.4; 356/301

(58) Field of Classification Search ............... 55/385.3, 55/385.2; 95/95, 148, 273; 96/397, 405, 96/417; 250/287, 288, 366, 361 R; 73/23.4; 356/301

See application file for complete search history.

(56) References Cited

U.S. PATENT DOCUMENTS

| 4,651,010 | A | | 3/1987 | Javan |
| 4,793,832 | A | | 12/1988 | Veltman et al. |
| 4,822,386 | A | | 4/1989 | Duchesneau |
| 4,906,440 | A | * | 3/1990 | Kolesar, Jr. .................. 422/98 |
| 4,983,190 | A | | 1/1991 | Verrando et al. |
| 5,010,907 | A | | 4/1991 | Henson et al. |
| 5,047,723 | A | * | 9/1991 | Puumalainen ............... 324/464 |
| 5,061,296 | A | | 10/1991 | Sengpiel et al. |
| 5,263,477 | A | | 11/1993 | Crome |
| 5,298,054 | A | | 3/1994 | Malik |
| 5,323,624 | A | | 6/1994 | Schwalm |
| 5,327,744 | A | | 7/1994 | Frawley et al. |
| 5,343,692 | A | | 9/1994 | Thomson et al. |
| 5,413,914 | A | | 5/1995 | Case et al. |
| 5,468,968 | A | | 11/1995 | Bailey et al. |
| 5,665,143 | A | | 9/1997 | Jarvis et al. |
| 5,874,046 | A | | 2/1999 | Megerle |

(Continued)

FOREIGN PATENT DOCUMENTS

DE    4000491 A1    7/1991

Primary Examiner—Minh-Chau T. Pham
(74) Attorney, Agent, or Firm—Jeffrey L. Costellia; NixonPeabody, LLP

(57) ABSTRACT

A protective system having an upstream detection subsystem to detect a contaminant in an airflow and to provide a contaminant signal, an upstream detection subsystem, a filtration subsystem to filter the contaminant from the airflow, a valve adapted to allow selective routing of the airflow, and a control system adapted to control the valve to route the airflow through the protective system upon receiving the contaminant signal from the upstream detection subsystem. In one embodiment, the upstream detection subsystem includes at least two different types of detectors for detecting same type of contaminants. In another embodiment, the upstream detection subsystem is adapted to detect a contaminant, and a daughter compound. In another embodiment, the protective system includes a downstream detection subsystem. In yet another embodiment, the protective system includes a vehicle data link subsystem.

27 Claims, 1 Drawing Sheet

U.S. PATENT DOCUMENTS

| | | |
|---|---|---|
| 5,915,268 A * | 6/1999 | Linker et al. ............... 73/23.2 |
| 6,096,267 A | 8/2000 | Kishkovich et al. |
| 6,099,617 A | 8/2000 | Bennett |
| 6,100,698 A * | 8/2000 | Megerle et al. ............ 324/464 |
| 6,207,460 B1 | 3/2001 | Kishkovich et al. |
| 6,386,158 B1 * | 5/2002 | Takahashi ............... 123/90.15 |
| 6,402,812 B1 * | 6/2002 | Perrotta et al. .............. 95/95 |
| 2001/0029793 A1 * | 10/2001 | Moler et al. ............ 73/863.22 |
| 2002/0073842 A1 | 6/2002 | Gruber |
| 2003/0085348 A1 * | 5/2003 | Megerle ................... 250/287 |
| 2004/0020267 A1 * | 2/2004 | Megerle .................. 73/31.03 |
| 2004/0047776 A1 * | 3/2004 | Thomsen ............. 422/186.07 |

* cited by examiner

VEHICLE INTEGRATED PROTECTIVE SYSTEM

RELATED APPLICATION DATA

This application claims priority to U.S. provisional application Ser. No. 60/402,702 filed on Aug. 13, 2002, the disclosure of which is incorporated herein by reference.

BACKGROUND OF THE INVENTION

1. Field of the Invention

The present invention is generally directed to protective systems that are at least partially integrated into a vehicle for protecting humans from chemical, biological, radiological, and/or nuclear contamination. In particular, the present invention is directed to such a protective system that provides accurate detection of contaminants and facilitates dissemination of information regarding the contamination through a network.

2. Description of Related Art

The threat of use of chemical, biological, radiological, and/or nuclear weapons of mass destruction is a significant factor in military planning and posture. Many nations own, or are seeking to acquire, the technology and equipment for manufacturing various types of weapons of mass destruction including chemical, biological, radiological, and/or nuclear (hereinafter "CBRN") weapons. With increasing uncertainties regarding the possibility of one or more of these nations using such weapons of mass destruction during time of war or other conflict, systems are desirable for protecting military personnel and/or civilians from becoming contaminated by the use of such weapons which can result in illness or even death.

Various devices have been developed to address some aspects of the above described threat. For example, U.S. Pat. No. 4,983,190 to Verrando et al. discloses an adsorption system that removes a wide range of toxic vapors. In particular, the reference discloses that the adsorption system purifies air contaminated by nuclear, biological, or chemical warfare agents so that the air may be supplied to persons inside a vehicle or an aircraft. The reference further discloses a chemical agent vapor detector that provides an advanced warning via an alarm. The reference further discloses the use of carbon beds and filters to remove chemical agents and particulates such as bacteria and viruses.

In addition, U.S. Pat. No. 4,651,010 to Javan discloses a method and system for detecting chemical and biological agents for the military. The reference discloses that the system is provided with a sensor for detecting such agents, and a telemetry transmitter that transmits data to a base site. Furthermore, U.S. Pat. No. 5,327,744 to Frawley et al. discloses an environmental control system that is integrated into a helicopter which provides a nuclear/biological/chemical life support system that provides decontaminated air to the cockpit of the helicopter.

However, the above noted references fail to disclose a system that detects CBRN contaminants with enhanced accuracy. Moreover, the references further fail to disclose such a system that allows accurate dissemination of information regarding the CBRN contaminant encountered. Therefore, there exists an unfulfilled need for a protective system which is at least partially integrated with the vehicle which provides accurate detection of contaminants, and facilitates dissemination of information regarding the contamination through a network.

SUMMARY OF THE INVENTION

In view of the foregoing, an advantage of the present invention is in providing a protection system that protect humans from CBRN contaminants.

One aspect of the present invention is a protection system that is adapted to detect CBRN contaminants with increased accuracy using at least two different detection technologies to detect one type of contaminant.

Another aspect of the present invention is a protection system that is adapted to detect CBRN contaminants and their daughter (decayed) compounds.

Still another aspect of the present invention is a system that actively senses contaminants even after processing the air flow, and reprocessing the airflow if contaminants are detected.

Yet another aspect of the present invention is a system that is network-centric to allow dissemination of information regarding CBRN contamination.

Still another aspect of the present invention is an analysis subsystem having analysis capabilities, including capabilities to identify any sub-threshold exposure which did not trigger CBRN alarm or activate the filtration system.

These and other aspects of the present invention are attained by a protective system at least partially integrated with a vehicle for protecting occupants of the vehicle from contaminants. In accordance with one embodiment, the protective system comprises an upstream detection subsystem adapted to detect a contaminant in an airflow provided to a cabin of the vehicle and to provide a contaminant signal indicating the presence of the contaminant in the airflow, the upstream detection subsystem including at least two different types of detectors for detecting same type of contaminants, a filtration subsystem adapted to filter the contaminant from the airflow, a valve adapted to allow selective routing of the airflow through the protective system, and a control system adapted to control the valve to route the airflow through the protective system upon receiving the contaminant signal from the upstream detection subsystem.

In accordance with another embodiment, the protective system comprises an upstream detection subsystem adapted to detect a contaminant and a daughter compound associated with the contaminant in an airflow provided to a cabin of the vehicle, and to provide a contaminant signal to indicate the presence of the contaminant and the daughter compound in the airflow, a filtration subsystem adapted to filter the contaminant from the airflow, a valve adapted to allow selective routing of the airflow through the protective system, and a control system adapted to control the valve to route the airflow through the protective system upon receiving the contaminant signal from the upstream detection subsystem.

In still another embodiment, the protective system comprises an upstream detection subsystem adapted to detect a contaminant in an airflow provided to a cabin of the vehicle and to provide contaminant data indicating the presence of the contaminant in the airflow, the upstream detection subsystem including at least two different types of detectors for detecting same type of contaminants, a filtration subsystem adapted to filter at least the contaminant from the airflow, a valve adapted to allow selective routing of the airflow through the protective system, a control system adapted to control the valve to route the airflow through the protective system upon receiving the contaminant signal from the upstream detection subsystem, and a downstream detection subsystem positioned downstream of the filtration subsystem, the downstream detection subsystem being adapted to detect the contaminant in the airflow after filtration by the filtration system, and to provide secondary contaminant signal indicating presence of the contaminant in the airflow after filtration by the filtration system.

In yet another embodiment of the present invention, the protective system comprises an upstream detection subsystem adapted to detect a contaminant in an airflow provided to a cabin of the vehicle and to provide contaminant data indicating presence of the contaminant in the airflow, a filtration subsystem adapted to filter the contaminant from the airflow, a valve adapted to allow selective routing of the airflow through the protective system, a control system adapted to control the valve to route the airflow through the protective system upon receiving the contaminant signal from the upstream detection subsystem, and a vehicle data link subsystem adapted to obtain information regarding the contaminant and location of the vehicle.

These and other advantages and features of the present invention will become more apparent from the following detailed description of the preferred embodiments of the present invention when viewed in conjunction with the accompanying drawing.

DETAILED DESCRIPTION OF THE PREFERRED EMBODIMENT

Figure 1:
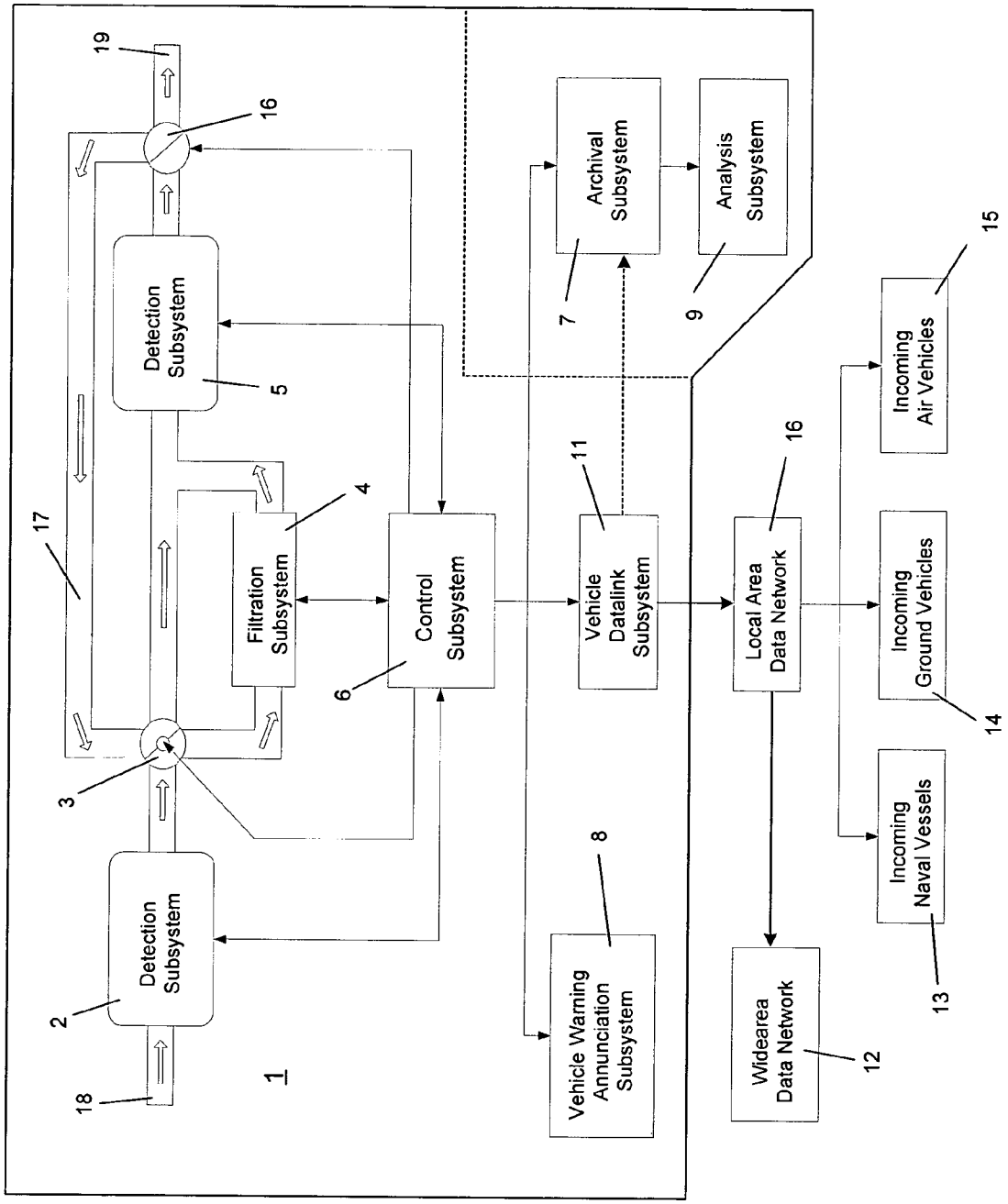
FIG. 1 is a schematic illustration of the vehicle integrated protective system for protecting humans from CBRN contamination in accordance with one embodiment of the present invention.

FIG. 1 is a schematic illustration of a vehicle integrated protective system 1 in accordance with one embodiment of the present invention that may be used to protect humans in the cabin of the vehicle from CBRN (chemical, biological, radiological, and/or nuclear) contamination. Initially, it should be noted that as used herein, the term "vehicle" refers to any mobile asset such as aircraft, helicopters, trucks, cars, tanks, buses, personnel carriers, train cars, etc., that maybe used for military and/or civilian applications. Consequently, the protective system 1 of the present invention may be applied to all types of vehicles. Therefore, details of such vehicles are omitted herein.

In the schematically illustrated embodiment of FIG. 1, the protective system is at least partially integrated with a vehicle and includes various subsystems as discussed below. In particular, the protective system 1 of the present invention is at least partially integrated with the environmental control system (ECS) or air filtration system (AFS) present in most vehicles. Such ECS/AFS systems typically include various ducts, valves and fans for providing airflow to the occupants of the vehicle and often include other devices for controlling the temperature in the cabin, such as air conditioning and/or heating.

In the protective system 1 shown in FIG. 1, the primary subsystems include an upstream detection subsystem 2, a valve 3, a filtration subsystem 4, a downstream detection subsystem 5, a control subsystem 6, an archival subsystem 7, a vehicle warning annunciation system 8, an analysis subsystem 9, a vehicle data link subsystem 11, a reprocessing valve 16, as well as various ducts 17 for conveying airflow in the protective system 1, the specific details of each being described below. Of course, it should be evident that in the illustrated embodiment, the subsystems are separated based on their respective function. However, it should be understood that in other embodiments, various subsystems may be combined and implemented together, or in any other appropriate manner. Moreover, it should also be noted that not all subsystems need be provided to practice various aspects of the present invention.

In the preferred embodiment shown, the upstream detection subsystem 2 that is adopted to detect CBRN contaminants is packaged and integrated into the vehicle's ECS/AFS near the source(s) of air inflow from the outside, such as from the intake 18. The sensors of the upstream detection subsystem 2 are connected to the control subsystem 6, which monitors the status of the sensors and provides control signals to correspondingly operate the valve 3. In particular, the forward detection subsystem 2 generates and relays a contaminant signal to the control subsystem 6. The control subsystem 6 analyzes the received contaminant detection signal and determines whether the level of detection exceeds predetermined minimum thresholds set for lethal or incapacitating dosage for the CBRN contaminant detected. If the control subsystem 6 determines that the minimum threshold level of a CBRN contaminant has been detected and/or exceeded, the control subsystem 6 activates the valve 3 to redirect the airflow from an air supply line or air ducts that provides airflow to the cabin of the vehicle, to the air supply line or air ducts equipped with the filtration subsystem 4.

In the illustrated embodiment, the valve 3 is electronically controlled by the control subsystem 6 so that rapid actuation of the valve 3 is attained. An important advantage of the presently illustrated embodiment is in providing the valve 3 which allows timely synchronization of the valve 3 by the control subsystem 6 in response to the contaminant signal of the forward detection subsystem 2. At the onset of notification by the detection subsystem 2 as to presence of CBRN contaminants, the control subsystem 6 activates the valve 3 in a timely manner to ensure the routing of the contaminated airflow through the filtration subsystem 4 prior to its arrival at the valve 3. Of course, in other embodiments, other types of valves such as a manually operated valve may be provided instead. Occupants of the vehicle can then be warned of possible contamination, via the vehicle warning annunciation subsystem 8, so that filtration subsystem 4 can be utilized. The above described embodiment also allows the crews to quickly identify the degrees of contamination intrusion, and verify the effectiveness of the filtration subsystem 4 described in detail below, and to operate the vehicle in a modified protection posture.

Referring again to FIG. 1, when the valve 3 is actuated, the airflow from the intake 18 is diverted to the filtration subsystem 4 of the protective system 1. The filtration subsystem 4 provides active protection from CBRN contaminants by filtering the airflow prior to reaching the outlet 19 which directs the airflow to the vehicle's crew cabin. In this regard, the filtration subsystem 4 of the protective system 1 is at least partially integrated with the vehicle's ECS/AFS. Of course, in other embodiments, the airflow ducts of the vehicle may be completely bypassed. The filtration subsystem 4 may also be designed for multiple inline or multiple parallel installations, which are integrated to the ECS/AFS airflow ducts. In addition, the filtration subsystem 4 may also be designed to have a modular form factor to allow simpler adaptation to the ECS/AFS of multiple types of vehicles.

In accordance with one aspect of the present invention, once the airflow is filtered by the filtration subsystem 4, the airflow is re-tested by the downstream detection subsystem 5 to ensure contaminants have been removed. If CBRN contaminants are still detected by the downstream detection subsystem 5, the downstream detection subsystem 5 provides a secondary contaminant signal to the control system 6. The control system, in turn, operates the reprocessing valve 16 to re-divert the airflow to the filtration subsystem 4 to thereby filter the airflow again, before the contaminated airflow reaches the outlet 19. This closed loop operation of the protective system in accordance with the illustrated embodiment ensures that CBRN contaminants in the airflow reaching the outlet 19 that is provided to the vehicle cabin is removed, or within acceptable limits.

Any appropriate filters for filtering air and providing protection from CBRN contaminants may be utilized in implementing the filtration subsystem 4. For instance, the filtration subsystem 4 can include barrier and/or absorption-type filters that are disposable or regenerable (i.e., self-cleaning). Alternatively, or in addition thereto, the filtration subsystem 4 can include electric field filtration and/or corona discharge filtration. The details of such filters are known and thus, omitted herein. Of course, the protection system 1 in accordance with other implementations may utilize additional filtering and purification devices to re-filter the air supply to provide more redundant and fault-tolerant crew protection.

The filtration subsystem 4 contains at least one static filtration stage per critical ECS/AFS node to ensure continuous availability and fault-tolerant CBRN contamination protection. In this regard, the filtration subsystem 4 in accordance with one implementation may contain multiple on-demand filters controlled by the control subsystem 6 in response to the upstream detection subsystem 2 and/or downstream detection subsystem 5 as described above. In such an embodiment, the protective system 1 ensures that some levels of protection are available while additional protection can be introduced on demand by the crew of the vehicle or automatically by the protection system.

Of course, these types of filters are provided merely as examples that can be effectively used in the filtration subsystem 4, and other types of filters can be used as well. It should also be appreciated that as used herein, "filter" or "filtration" also includes processing or neutralizing the contaminants in the airflow so that they are no longer harmful to humans, for example, chemical processes for neutralizing chemical and/or biological contaminants. Alternatively or in addition thereto, the airflow may be completely diverted so that it bypasses the occupant cabin entirely and the occupants of the vehicle provided with an alternative source of breathable air.

As described, the upstream detection subsystem 2 of the protective system 1 is adapted to detect the presence of CBRN contaminants in the area or location of the vehicle provided with the protective system 1 by continuously monitoring the inflow of air through the intake 18 of the vehicle's ECS/AFS for any indication of CBRN contamination. In addition, the protective system 1 is adapted to direct airflow to the filtration subsystem 4 if contaminants are detected, or alternatively, cause the contaminated air to bypass the vehicle cabin altogether. Further, the control subsystem 6 is adapted to intelligently process signals from various individual detectors such as the upstream detection subsystem 2 and the downstream detection subsystem 5 to provide more complete determination and verification of the presence of contaminants in the manner described below.

If the control system 6 of the present embodiment receives detection at any level of CBRN contamination (above, at, or below lethal and incapacitating levels), the control system 6 records the detection event along with the date/time, location, meteorological conditions, etc., and stores this information through the archival system 7 for subsequent retrieval and analysis by the analysis subsystem 9 or by other various information technology tools. In this regard, whereas the present invention is especially advantageous in protecting occupants of the vehicle when unacceptable CBRN contamination levels are detected, the protective system 1 may also be used when the detected CBRN contamination levels are within acceptable levels. In particular, the control system 6 may then be adapted to store information and data regarding contaminant detection even at acceptable levels in the archival system 7 for further analysis. Such information and data allows determination of whether there are any effects or illnesses caused by exposure to low levels of a contaminant, especially if the exposure is over an extended period. In other embodiments, the recorded and archived data may be collected from other vehicles as well, using secure networks in the manner as described in further detail below.

Depending on a user definable minimum threshold for generating a warning, the control subsystem 6 operates the vehicle warning annunciation subsystem 8 to warn the occupants of the vehicle that contaminants have been detected. Depending on unique requirements for each vehicle, the warning annunciation subsystem 8 can provide a visual and/or aural warning to the occupants using any appropriate device or indicating mechanisms, for example, an existing vehicle caution annunciation system. In one implementation, the annunciation provided by the vehicle warning annunciation subsystem 8 can be varied to depend on the level and persistence of contaminant detection where more urgent and noticeable warning is issued for higher levels of contamination.

In accordance with one aspect of the present invention, the upstream detection subsystem 2 is adapted to detect CBRN contaminants using stand-alone, independent CBRN contamination sensors. In particular, the forward detection subsystem 2 utilizes at least two different sensors which detect a particular type of contaminant, the at least two different sensors using independent detection methods that are different from each other. Stated in another manner, the upstream detection subsystem 2 utilizes sensors that detect the same type of CBRN contaminants using different sensing technologies and/or methodologies. This provides redundant detection of the same type of contaminant to thereby enhance accuracy in detection and reliability.

In the above regard, it should be understood what is meant by a "particular type of contaminant" and "different sensors". Chemical contaminants, biological contaminants, and radiological/nuclear contaminants are different types of contaminants which are detectable using sensors which are designed to detect a specific type of contaminant. However, there are typically various available sensors that utilize several different methods or technologies to detect the type of contaminant for which the sensor was designed.

For example, for detecting chemical contaminants, the upstream detection subsystem 2 may be provided with, and utilize, a surface acoustic wave (SAW) based chemical agent detector such as JCAD sensor from BAE Systems, as well as an ion mobility spectrometry (IMS) based chemical agent detector such as LCAD sensor from Graseby Dynamics, or a Fourier Transformed infrared-based chemical agent detector. As can be appreciated by one of ordinary skill in the art, these chemical agent detectors are different types of detectors that utilize different sensing technologies and/or methodologies.

Thus, by utilizing at least two different types of detectors, the forward detection subsystem 2 provides orthogonal and confirmatory verification of detection of a particular CBRN contaminant, thereby providing real-time or near-real-time detection of CBRN contaminants while minimizing false positive indications as compared to conventional protection systems that utilize a single type of sensor to detect a particular type of CBRN contaminant.

The upstream detection subsystem 2 in accordance with the illustrated embodiment is also provided with various other detectors to detect biological, radiation and nuclear contaminants. For example, fiber-optical florescent biological agent detectors, and Germanium or CZT gamma radiation detectors may be provided. Moreover, in a similar manner to the above, multiple detectors may be provided in the upstream detection subsystem 2 for biological, radiation and nuclear contaminants to enhance accuracy and reliability in detecting these types of contaminants. Of course, the above noted sensors are provided as examples of the types of sensors, and other types of sensors may also be used instead of or in conjunction therewith.

In accordance with the preferred embodiment, the downstream detection subsystem 5 is also provided with at least two sensors for detecting at least one type of contaminant, the two sensors utilizing differing technologies and/or methods to detect the contaminant as previously described. This allows the downstream detection subsystem 5 to provide accurate detection of contaminants while minimizing false positive indications.

In some vehicle applications, CBRN contaminants are ingested into an engine of the vehicle where the contaminants are exposed to high temperatures and pressures which break down the contaminants into daughter compounds. In other instances, some or all of the CBRN contaminants are broken down into unique daughter compounds by virtue of age, environmental conditions, etc. Thus, in accordance with another aspect of the present invention, the upstream detection subsystem 2 and/or the downstream detection subsystem 5 of the protective system 1 are further adapted to detect such daughter compounds thereby allowing confirmation of the presence and/or detection of the parent CBRN contaminants. This independent confirmation by detection of daughter compounds downstream of the engines can be used to significantly reduce false positive indications provided by agent-only detection systems known in the prior art.

In the above regard, it has been found that the compressor section of turbine engines commonly used in the various vehicles such as aircraft, helicopters, tanks, and personnel carriers break down many CBRN contaminants into daughter compounds for detection by the protective system 1 in the vehicle bleed air ducting in the manner described. For example, chemical agent GD (Pinacolyl methylphosphonofluoridate), also known as Soman, breaks down into MPF (Methyl phosponoflouridic acid) and various aldehydes. Thus, in this example, corresponding detectors for detecting the parent agent GD, as well as the MPF and/or daughter compound(s) aldehydes, may be provided in the upstream detection subsystem 2 and/or the downstream detection subsystem 5 in the ducting for the engine bleed air. Of course, this bleed air may be tapped off of the compressor section of the turbine engine before any fuel is injected or combusted. Therefore, no exhaust is provided to the occupant cabin.

The control subsystem 6 may be also adapted to perform startup initiation procedures, perform self tests for the protection system 1, and facilitate recording of valuable data associated with incidences of CBRN contamination detection at any detectable dosage levels by stamping each contamination event with vehicle data pulled from the vehicle data bus. This information can then be stored in the archival subsystem 7 thereby allowing attribution of CBRN contamination events for post-processing via the analysis subsystem 9, for example. Of course, these features of the protection system 1 are optional and are not required to practice the various aspects of the present invention.

Furthermore, in accordance with another aspect of the protective system 1 of the present invention, the control system 6 is adapted to provided the data and information associated with the detection event(s) to the vehicle data link subsystem 11 when the level of dosage meets or exceeds the threshold set for incapacitating or lethal doses of the particular CBRN contaminant(s) detected. The vehicle data link subsystem 11 prepares and provides preformatted data and information associated with the detection event(s) for distribution via the wide area data network 12 and/or local area data network 16 as described in further below. In this regard, contamination information disseminated through the vehicle data link subsystem 11 can then be routed through an existing global or wide-area command and control infrastructure.

In the military context, the vehicle data links are usually implemented as over-the-air radio frequency transmissions on local-area, over-the-battlefield distances (over several hundred miles in some cases), while relying on satellite communication and land lines for worldwide coverage. Thus, the contaminant detection data and information can be provided to the local area data network 16 which may be implemented as an aircraft tactical data link, such implementation allowing tactical and strategic assets such as incoming naval vessels 13, ground vehicles 14, and air vehicles 15 within the local area data network 16, to receive the CBRN contamination warning. This allows incoming vehicles, and vehicles in proximity, to re-route their course to avoid the contaminated area, or to activate protective systems if so equipped. The warning would also provide decision-makers with information required for real-time assessment and management of CBRN contaminant releases. In addition, the detection information can also be provided to the wide area data network 12, for example, the global Command, Control, Communication, Computer, Intelligence, Surveillance, and Reconnaissance (C4ISR) infrastructure for government/military applications.

In a civilian context, the vehicle data link subsystem 11 for local area data networks 16 can be implemented using wireless network WiFi or Bluetooth technologies, while the wide-area network is implemented using the Internet. Thus, the present invention can be implemented using these communication infrastructures to disseminate CBRN contaminant detection events to the tactical and strategic decision-makers for the military as well as local, state, and national emergency responders for civilian use. Correspondingly, the present invention facilitates decision-making processes by appropriate individuals by making the data and information associated with the detection of CBRN contaminants substantially immediately available through the local and wide-area networks.

Thus, the above described implementation of the protective system 1 allows near-real-time theater and global-level dissemination and warning regarding CBRN contamination by vehicles that are equipped with the protective system 1. Of course, the data provided to the wide area data network 12 can then be downloaded and used in any appropriate manner, for example, via a handheld device connected through a data port, through the removal of a recording media from the recorder itself, etc.

It should be noted that in many applications of the protection system 1, the vehicle data link subsystem 11 may already be provided. In such instances, the preexisting vehicle data link subsystem 11 can be modified to perform the function of receiving the CBRN contamination data and information, and disseminating the contamination data to other vehicles within the local area data network 16 in the manner described. Of course, a different mechanism may be used to disseminate the contamination data to other vehicles within a data network in other implementations of the present invention as well.

In accordance with the illustrated embodiment of the protective system 1, the recorded data provided to the vehicle data link subsystem 11 are consolidated in an archiving subsystem 7. The archival subsystem 7 may be implemented in any appropriate manner. For example, the archival subsystem 7 can be implemented as a database to index and catalog contamination events along with attribution data for immediate data analysis and historical storage. Of course, other ancillary features can also be provided in the archival subsystem 7 as well, such as automated backup and recovery features, and multi-threaded access/analysis features. Moreover, various data structures can be used by the archival subsystem 7 to substantially reduce storage requirements while improving data throughput.

It should also be appreciated that in accordance with another implementation, the archival subsystem 7 may be resident in a single reporting station that is at a different location than on the vehicle itself, as evidenced by the dashed line connection between the vehicle data link subsystem 11 and the archiving subsystem 7. Moreover, the archival subsystem 7 can be implemented to receive contaminant data/information from various vehicles utilizing the present system so that it acts as a repository of information which is later retrieved and used in any desired manner, for example, analyzed using the analysis subsystem 9.

In the civilian implementation of the present invention, the archiving subsystem 7 can be implemented as a web-based data storage and retrieval system, and/or data analysis system. With respect to the web-based data retrieval function, the archival subsystem 7 can be adapted to collect data regarding contamination events from the control subsystem 6 from various vehicles through a secure web-based, wide area data network 12. In this regard, the archival subsystem 7 can be implemented to automatically respond to data upload requests by control subsystems 6 in remote locations via vehicle data link subsystem 1, and store data provided by the control subsystems 6 of the various vehicles.

Furthermore, the analysis subsystem 9 is preferably adapted to conduct detailed analysis of CBRN contamination data and information provided by the control subsystem 6. For example, the analysis subsystem 9 is adapted to perform spatial and temporal data fusion, while also allowing detailed analysis of the contamination events by trained analysts for confirmation. More specifically, spatial data fusion is performed using recorded data from multiple vehicles that were in close proximity to the suspected contamination event to confirm the presence of CBRN contaminants and to provide indication regarding the size of the area contaminated. Similarly, temporal data fusion is performed using recorded data from multiple vehicles in the proximity of a suspected contaminated area over a period of time to determine persistence of the contamination.

In the above described manner, the present invention provides a protective system that is useful to protect humans from CBRN contamination. It should now be evident to one of ordinary skill in the art how the protective system is at least partially integrated into a vehicle, and is adapted to senses contaminants, and to protect the occupants of the vehicle. It should be appreciated that whereas one preferred embodiment of the present invention was described in detail above, alternative embodiments of the present invention need not incorporated all of the features. For instance, the data link and archiving subsystems may be omitted in other embodiments of the present invention so that a simplified protective system is provided.

As can now be appreciated, the individual subsystems described above perform important functions so that the protective system 1 in accordance with the present invention provides the capability to more effectively deal with CBRN contamination threats against military and civilian vehicles. For civilian application, the present invention allows the crews and passengers to maintain normal cabin posture. For military application, this invention is especially advantageous because presently, a mere threat of contamination must be responded to by donning of Mission Oriented Protective Posture (MOPP) protective equipment. The most severe threat level, MOPP-4, greatly restricts mobility, endurance, and effectiveness of personnel due to the mandatory wearing of an over garment, a helmet cover, a vinyl over-boot, a mask, a hood, and gloves.

Thus, while various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

What is claimed is:

1. A protective system at least partially integrated with a vehicle for protecting occupants of the vehicle from contaminants, said protective system comprising:

an upstream detection subsystem adapted to detect a contaminant in an airflow provided to a cabin of said vehicle, and to provide a contaminant signal indicating presence of said contaminant in said airflow, said upstream detection subsystem including at least two detectors that use different means of detecting contaminants to detect said contaminant;

a filtration subsystem adapted to filter at least said contaminant from said airflow;

a valve adapted to allow selective routing of said airflow through said protective system;

a control system adapted to control said valve to route said airflow through said protective system upon receiving said contaminant signal from said upstream detection subsystem;

a downstream detection subsystem positioned downstream of said filtration subsystem, and being adapted to detect said contaminant in said airflow after filtration by said filtration subsystem, and to provide secondary contaminant signal indicating presence of said contaminant in said airflow after filtration by said filtration subsystem; and a reprocessing valve downstream of said downstream detection subsystem;

wherein said control system is further adapted to control said reprocessing valve to route said airflow downstream of said filtration subsystem back through said filtration subsystem upon receiving said secondary contaminant signal from said downstream detection subsystem.

2. The system of claim 1, wherein said at least two detectors are adapted to detect one of a chemical contaminant, biological contaminant, radiological contaminant, or nuclear contaminant in said airflow.

3. The system of claim 1, wherein said downstream detection subsystem includes at least two detectors that use different means of detecting contaminants from each other.

4. The system of claim 1, wherein said upstream detection subsystem is further adapted to detect a daughter compound associated with said contaminant, and to provide contaminant signal indicating presence of said daughter compound in said airflow.

5. The system of claim 1, further comprising a vehicle data link subsystem adapted to obtain information regarding detection of said contaminant and location of said vehicle.

6. The system of claim 5, wherein said vehicle data link subsystem is connected to a data network adapted to disseminate said information regarding detection of said contaminant and location of said vehicle.

7. The system of claim 1, further comprising an archival subsystem adapted retrievably store said information regarding detection of said contaminant and location of said vehicle.

8. A protective system at least partially integrated with a vehicle for protecting occupants of the vehicle from contaminants, said protective system comprising:
an upstream detection subsystem adapted to detect a contaminant and a daughter compound associated with said contaminant in an airflow provided to a cabin of said vehicle, and to provide contaminant signal indicating presence of said contaminant and said daughter compound in said airflow;
a filtration subsystem adapted to filter at least said contaminant from said airflow;
a valve adapted to allow selective routing of said airflow through said protective system; and
a control system adapted to control said valve to route said airflow through said protective system upon receiving said contaminant signal from said upstream detection subsystem.

9. The system of claim 8, wherein said upstream detection subsystem is adapted to detect at least one of a chemical contaminant, biological contaminant, radiological contaminant, or nuclear contaminant in said airflow.

10. The system of claim 8, wherein said upstream detection subsystem includes at least two different types of detectors that use different sensing methodologies.

11. The system of claim 8, further comprising a downstream detection subsystem positioned downstream of said filtration subsystem, said downstream detection subsystem being adapted to detect said contaminant in said airflow after filtration by said filtration subsystem system.

12. The system of claim 11, wherein said downstream detection subsystem is further adapted to provide secondary contaminant signal indicating presence of said contaminant in said airflow after filtration by said filtration subsystem.

13. The system of claim 12, further comprising a reprocessing valve downstream of said downstream detection subsystem, and wherein said control system is further adapted to control said reprocessing valve to route said airflow downstream of said filtration subsystem back through said filtration subsystem upon receiving said secondary contaminant signal from said downstream detection subsystem.

14. The system of claim 11, wherein said downstream detection system is adapted to detect said daughter compound of said contaminant.

15. The system of claim 11, wherein said downstream detection subsystem includes at least two different types of detectors for detecting same type of contaminants.

16. The system of claim 8, further comprising a vehicle data link subsystem adapted to obtain information regarding detection of said contaminant and location of said vehicle.

17. The system of claim 16, wherein said vehicle data link subsystem is connected to a data network adapted to disseminate information regarding detection of said contaminant and location of said vehicle.

18. The system of claim 8, further comprising an archival subsystem adapted retrievably store said information regarding detection of said contaminant and location of said vehicle.

19. A protective system at least partially integrated with a vehicle for protecting occupants of the vehicle from contaminants, said protective system comprising:
an upstream detection subsystem adapted to detect a contaminant in an airflow provided to a cabin of said vehicle and to provide contaminant signal indicating presence of said contaminant in said airflow, said upstream detection subsystem including at least two detectors that detect said contaminant using different sensing technologies;
a filtration subsystem adapted to filter at least said contaminant from said airflow;
a valve adapted to allow selective routing of said airflow through said protective system;
a control system adapted to control said valve to route said airflow through said protective system upon receiving said contaminant signal from said upstream detection subsystem;
a downstream detection subsystem positioned downstream of said filtration subsystem, said downstream detection subsystem being adapted to detect said contaminant in said airflow after filtration by said filtration subsystem, and is further adapted to provide secondary contaminant signal indicating presence of said contaminant in said airflow after filtration by said filtration subsystem; and
a reprocessing valve downstream of said downstream detection subsystem;
wherein said control system is further adapted to control said reprocessing valve to route said airflow downstream of said filtration subsystem for further processing upon receiving said secondary contaminant signal from said downstream detection subsystem.

20. The system of claim 19, wherein said reprocessing valve routes said airflow back through said filtration subsystem.

21. A protective system at least partially integrated with a vehicle for protecting occupants of the vehicle from contaminants, said protective system comprising:
an upstream detection subsystem adapted to detect a contaminant in an airflow provided to a cabin of said vehicle and to provide contaminant signal indicating presence of said contaminant in said airflow;
a filtration subsystem adapted to filter at least said contaminant from said airflow;
a valve adapted to allow selective routing of said airflow through said protective system;

a control system adapted to control said valve to route said airflow through said protective system upon receiving said contaminant signal from said upstream detection subsystem; and a vehicle data link subsystem adapted to obtain information regarding detection of said contaminant and location of said vehicle.

22. The system of claim 21, wherein said vehicle data link subsystem is connected to a data network adapted to disseminate information regarding detection of said contaminant and location of said vehicle.

23. The system of claim 22, wherein said data network is at least one of a wide area data network and a local area data network.

24. The system of claim 21, further comprising an archival subsystem adapted retrievably store said information regarding detection of said contaminant and location of said vehicle.

25. The system of claim 24, further comprising an analysis subsystem for analyzing said information regarding detection of said contaminant and location of said vehicle.

26. The system of claim 25, wherein said analysis subsystem is further adapted to perform spatial data fusion using said information regarding detection of said contaminant and location of said vehicle to determine information regarding area contaminated.

27. The system of claim 25, wherein said analysis subsystem is further adapted to perform temporal data fusion using said information regarding detection of said contaminant and location of said vehicle to determine persistence of contaminants in an area.

* * * * *